United States Patent
Saito et al.

(10) Patent No.: US 7,106,683 B2
(45) Date of Patent: Sep. 12, 2006

(54) OPTICAL PICKUP DEVICE AND RECORDING/REPRODUCING DEVICE

(75) Inventors: Kimihiro Saito, Saitama (JP); Tsutomu Ishimoto, Saitama (JP)

(73) Assignee: Sony Corporation, Tokyo (JP)

( * ) Notice: Subject to any disclaimer, the term of this patent is extended or adjusted under 35 U.S.C. 154(b) by 672 days.

(21) Appl. No.: 10/415,103

(22) PCT Filed: Aug. 27, 2002

(86) PCT No.: PCT/JP02/08627

§ 371 (c)(1),
(2), (4) Date: Apr. 30, 2003

(87) PCT Pub. No.: WO03/021583

PCT Pub. Date: Mar. 13, 2003

(65) Prior Publication Data

US 2004/0013077 A1    Jan. 22, 2004

(30) Foreign Application Priority Data

Aug. 31, 2001    (JP)    ............................. 2001-264467

(51) Int. Cl.
  *G11B 7/135* (2006.01)
(52) U.S. Cl. ............................. 369/112.24; 369/112.17
(58) Field of Classification Search ...................... None
See application file for complete search history.

(56) References Cited

U.S. PATENT DOCUMENTS

| | | | |
|---|---|---|---|
| 6,717,896 B1 * | 4/2004 | Imanishi | 369/53.27 |
| 6,791,913 B1 * | 9/2004 | Ishimoto | 369/44.25 |
| 6,845,066 B1 * | 1/2005 | Shingo | 369/44.23 |
| 2001/0053117 A1 * | 12/2001 | Ichimura et al. | 369/112.24 |
| 2003/0058777 A1 * | 3/2003 | Martynov et al. | 369/112.24 |

FOREIGN PATENT DOCUMENTS

| | | |
|---|---|---|
| JP | 11-250484 | 9/1999 |
| JP | 2000-200434 | 7/2000 |

OTHER PUBLICATIONS

U.S. Appl. No. 10/415,103, filed Apr. 30, 2003, Saito et al.
U.S. Appl. No. 10/714,866, filed Nov. 18, 2003, Saito et al.

* cited by examiner

Primary Examiner—Andrea Wellington
Assistant Examiner—Lixi Chow
(74) Attorney, Agent, or Firm—Oblon, Spivak, McClelland, Maier & Neustadt, P.C.

(57) ABSTRACT

An optical pickup device includes an objective lens (2), with a numerical aperture (NA) being not less than 1, having a solid immersion lens (1) which is made up by a spherical portion (1a) and a flat portion (1b) parallel to a surface (101a) of an optical disc (101). The component of the reflected light from the optical disc in the polarized state perpendicular to the polarized state of the reflected light which prevails when the distance between the surface of the optical disc and the flat portion of the solid immersion lens is zero is detected. The so detected light intensity is associated with the distance between the optical disc surface and the solid immersion lens to accurately detect the minute gap between the optical disc and the solid immersion lens.

5 Claims, 6 Drawing Sheets

OPTICAL PICKUP DEVICE AND RECORDING/REPRODUCING DEVICE

This application is a 371 of PCT/JP02/08627 Aug. 27, 2002.

TECHNICAL FIELD

This invention relates to an optical pickup device for reading out information signals recorded on an optical recording medium, such as an optical disc, and to a recording and/or reproducing apparatus provided with this optical pickup device. More particularly, it relates to an optical pickup device and a recording and/or reproducing apparatus configured for controlling the distance between an objective lens of the optical pickup device and an optical recording medium.

BACKGROUND ART

Currently, a large variety of optical recording mediums are in use. Typical of these are optical discs, such as a CD (Compact Disc) or a DVD (Digital Versatile Disc), and magneto-optical discs. The information signals, recorded on the optical disc of this type, are read out by condensing the light beam, radiated by a light source, provided in the optical pickup device, by an objective lens, illuminating the light beam to a signal recording surface of the optical disc and by detecting the light beam reflected back from the signal recording surface by a photodetector. It is noted that the information signals, recorded on the CD or on the DVD, are read out by detecting changes in reflectivity of the light beam, reflected back from the signal recording surface, by the photodetector. In the case of the magneto-optical disc, the information signals are read out by detecting the Kerr rotation of the light beam reflected from the signal recording surface of the disc.

The information signals recorded on the above-described optical disc are read out at least as the objective lens condensing the light beam radiated from the light source is kept out of contact with the optical disc.

The light spot of the light beam, condensed on the signal recording surface of the optical disc by the objective lens of the optical pickup device, is approximately given by $\lambda/NA$, where $\lambda$ is the wavelength of the illuminated light beam and NA is the numerical aperture. The resolution is also proportionate to this value.

Meanwhile, the following equation holds for NA:

$$NA = n \cdot \sin\theta$$

where n is the refractive index of the medium and $\theta$ is the angle of the ambient light incident on the objective lens.

If the medium is air, the value of NA cannot exceed 1 (unity). As a technique for a case in which this limit value is exceeded, an optical pickup device employing a solid immersion lens has been proposed (I. Ichimura et al., "Near-Field Phase-Change Optical Recording of 1.36 Numerical Aperture", Jpn. J. Appl. Phys. vol. 39, 962–967, 2000).

The solid immersion lens is formed of a material of the same refractive index as the optical disc substrate, and is made up by a spherical portion, forming a fraction of a sphere, and a flat portion facing the optical disc surface. The solid immersion lens, used in an optical pickup device, is used as the flat portion kept extremely close to the optical disc surface. The boundary surface between this solid immersion lens and the optical disc is traversed by an evanescent wave. It is this evanescent wave that reaches the signal recording surface of the optical disc.

When the information signals, recorded on the optical disc, are read out using this optical pickup device, a suitable gap needs to be provided between the rotationally driven optical disc and the solid immersion lens forming the objective lens. Since the gap as the air layer is provided between the optical disc and the solid immersion lens, an evanescent wave must be used in order to make the numerical aperture (NA) of the objective lens larger than 1 (unity). The evanescent wave is attenuated exponentially as from the boundary surface. It is therefore necessary that the gap between the optical disc and the solid immersion lens shall be of an extremely small value on the order of one-tenth of the light emission wavelength $\lambda$ of the light source provided on the optical pickup device, while it is necessary that the solid immersion lens shall be close to the signal recording surface.

For controlling the gap in this manner, a servo method has so far been proposed in which an electrode is formed on the surface of the solid immersion lens, the capacitance across the electrode and the optical disc is detected to derive a gap error signal, and in which the distance between the solid immersion lens and the optical disc is controlled based on this error signal.

For implementing this method, it is necessary to form the electrode on the surface of the solid immersion lens and to take out a signal line from this electrode to a controlling circuit. This, however, complicates the apparatus to render the manufacture of the optical pickup device difficult.

On the other hand, the present Applicant has already proposed, in the specification and drawings of the Japanese patent Application No. H10-249880, a method for detecting the return light from a glass master disc and for using thus return light as a gap error signal.

This method exploits the phenomenon in which, if the gap between the solid immersion lens and the glass master disc is zero, the solid immersion lens surface is contacted with a transparent photoresist on the glass master disc, so that there occurs no light reflection from the lens surface, however, if the gap is not zero, the light totally reflected on the solid immersion lens surface is returned, this light being used for detecting the gap.

This method can be used when the glass master disc is used and the photoresist for light exposure is transparent. This method, however, cannot be used for a case in which a reflective film, such as an aluminum film, a phase change film or a photomagnetic recording film, is formed on the disc surface, as in an optical disc, because the light then undergoes reflection on the optical disc surface, even though the gap between the disc and the solid immersion lens is zero.

DISCLOSURE OF THE INVENTION

It is therefore an object of the present invention to provide a novel optical pickup device and a recording and/or reproducing apparatus capable of resolving the problems inherent to the above-described conventional devices.

It is another object of the present invention to provide an optical pickup device whereby the minute gap between the optical disc having a reflective film formed on its surface and the solid immersion lens can be detected accurately and whereby the gap between the optical disc and the solid immersion lens can be controlled accurately. It is yet another object of the present invention to provide a recording and/or reproducing apparatus employing the optical pickup device and a controlling method for controlling the gap.

For accomplishing these objects, the present invention provides an optical pickup device including an objective lens, with a numerical aperture (NA) being not less than 1, having a solid immersion lens which is made up by a spherical portion and a flat portion parallel to the surface of an optical recording medium. The optical pickup device includes a light source for illuminating a light beam of a preset polarized state through the objective lens to the optical recording medium, and photodetector means for detecting the component of the light reflected back from the optical recording medium in the polarized state perpendicular to the polarized state of the reflected light which prevails when the distance between the surface of the optical recording medium and the flat portion of the solid immersion lens is zero. The intensity of light detected by the photodetector means is correlated with the distance between the surface of the optical recording medium and the flat portion of the solid immersion lens.

Preferably, the optical pickup device further includes driving means for causing movement of the solid immersion lens in a direction towards and away from the optical recording medium for varying the distance between the surface of the optical recording medium and the flat portion of the solid immersion lens, and controlling means for controlling the driving means for controlling the position of the solid immersion lens in the direction towards and away from the optical recording medium. The controlling means operates for maintaining the intensity of light detected by the photodetector means to a preset intensity for maintaining the distance between the surface of the optical recording medium and the flat portion of the solid immersion lens to a preset value.

The present invention also provides a recording and/or reproducing apparatus including medium holding means for holding an optical recording medium, and an optical pickup device including an objective lens, with a numerical aperture (NA) being not less than 1, having a solid immersion lens which is made up by a spherical portion and a flat portion parallel to the surface of an optical recording medium, held by the medium holding means, a light source for illuminating a light beam of a preset polarized state through the objective lens to the optical recording medium, and photodetector means for detecting the component of the light reflected back from the optical recording medium in the polarized state perpendicular to the polarized state of the reflected light which prevails when the distance between the surface of the optical recording medium and the flat portion of the solid immersion lens is zero. The optical pickup device writes or reads out information signals for the optical recording medium. The recording and/or reproducing apparatus also includes driving means for causing movement of the solid immersion lens in a direction towards and away from the optical recording medium for varying the distance between the surface of the optical recording medium and the flat portion of the solid immersion lens, and controlling means for controlling the driving means for controlling the position of the solid immersion lens in the direction towards and away from the optical recording medium. The controlling means operates for maintaining the intensity of light detected by the photodetector means to a preset intensity for maintaining the distance between the surface of the optical recording medium and the flat portion of the solid immersion lens to a preset value.

The present invention also provides a gap detecting method for detecting, in an optical pickup device including an objective lens, with a numerical aperture (NA) being not less than 1, having a solid immersion lens which is made up by a spherical portion and a flat portion extending parallel to the surface of an optical recording medium, the distance between the flat portion of the solid immersion lens and the surface of the optical recording medium. The method includes illuminating a light beam radiated from a light source of the optical pickup device through the objective lens to the optical recording medium in a preset polarized state, detecting, by photodetector means of the optical pickup device, the component of the light beam reflected from the optical recording medium in the polarized state perpendicular to the polarized state of the reflected light which prevails when the distance between the surface of the optical recording medium and the flat portion of the solid immersion lens, is zero, and correlating the intensity of light detected by the photodetector means with the distance between the surface of the optical recording medium and the flat portion of the solid immersion lens for detecting the distance between the surface of the optical recording medium and the flat portion of the solid immersion lens.

The present invention also provides a controlling method for controlling, in an optical pickup device including an objective lens, with a numerical aperture (NA) being not less than 1, having a solid immersion lens which is made up by a spherical portion and a flat portion parallel to the surface of an optical recording medium, the distance between the flat portion of the solid immersion lens and the surface of the optical recording medium, to a preset value. The method includes illuminating a light beam radiated from a light source of the optical pickup device through the objective lens to the optical recording medium in a preset polarized state, detecting, by photodetector means of the optical pickup device, the component of the light beam reflected from the optical recording medium in the polarized state which is perpendicular to the polarized state of the reflected light which prevails when the distance between the surface of the optical recording medium and the flat portion of the solid immersion lens is zero, moving the solid immersion lens in a direction towards and away from the optical recording medium, with use of driving means, for varying the distance between the surface of the optical recording medium and the flat portion of the solid immersion lens, and controlling the driving means, using controlling means, for controlling the position of the solid immersion lens in the direction towards and away from the optical recording medium. The controlling means operates for maintaining the intensity of light detected by the photodetector means to a preset intensity for maintaining the distance between the surface of the optical recording medium and the flat portion of the solid immersion lens to a preset value.

Other objects, features and advantages of the present invention will become more apparent from reading the embodiments of the present invention as shown in the drawings.

BEST MODE FOR CARRYING OUT THE INVENTION

Referring to the drawings, certain preferred embodiments of the present invention will be explained in detail.

Figure 1:
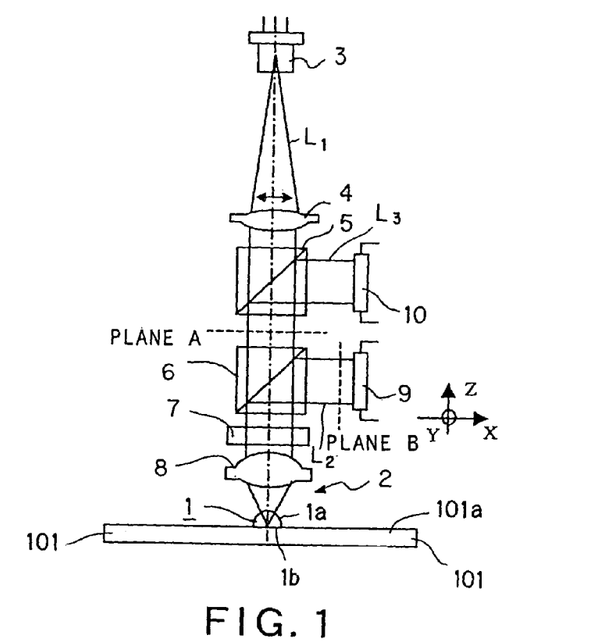
FIG. 1 is a side view showing the structure of an optical pickup device according to the present invention.

Referring to FIG. 1, an optical pickup device according to the present invention comprises an objective lens 2 including a solid immersion lens 1, with the numerical aperture (NA) being not less than 1. The solid immersion lens 1 includes a spherical surface portion 1a forming a portion of a sphere and a flat portion 1b facing a surface 101a of an optical disc 101 parallel thereto.

A distance (gap) $G_1$ between the flat portion 1b of the solid immersion lens 1 forming the objective lens 2 and the surface 101a of the optical disc 101 as an optical recording medium is controlled, by control means provided in the optical pickup device according to the present invention, so as to be a distance $G_1$ on the order of one-tenth of the wavelength $\lambda$ of a light beam radiated from a semiconductor laser 3 as a light source. The optical pickup device of the present invention, controlled in this manner, is used for a recording and/or reproducing apparatus, employing an optical disc as a recording medium. In this recording and/or reproducing apparatus, the distance or gap $G_1$ between the flat portion 1b of the solid immersion lens 1 forming the objective lens 2 and the surface 101a of the optical disc 101 is controlled to be within a preset range.

The optical pickup device according to the present invention detects the component of the light, which is radiated from a semiconductor laser 3, illuminated on the optical disc 101 and reflected from the reflective surface of the optical disc 101, and which is in a polarized state perpendicular to the polarized state of the reflected light which prevails when the distance or gap $G_1$ between the surface 101a of the optical disc 101 and the flat portion 1b of the solid immersion lens 1, is zero, thereby producing a gap error signal associated with the distance $G_1$ between the surface 101a of the optical disc 101 and the flat portion 1b of the solid immersion lens 1.

That is, with the optical pickup device according to the present invention, a light beam $L_1$, radiated from the semiconductor laser 3, is collimated by a collimator lens 4 to fall on a beam splitter 5. The wavelength of the light beam $L_1$, radiated from the semiconductor laser 3, is e.g., 40 nm. The light beam $L_1$, radiated from the semiconductor laser 3, is transmitted through the beam splitter 5 to fall on a polarized beam splitter 6. The light beam $L_1$, radiated from the semiconductor laser 3, is the P-polarized light with respect to the reflective surface of the polarized beam splitter 6, and is transmitted through this reflective surface and through the polarized beam splitter 6.

The light beam $L_1$, transmitted through the polarized beam splitter 6, is transmitted through a quarter wave ($\lambda/4$) plate 7, having its crystal axis tilted 45° relative to the direction of the incident polarized light, and is thereby turned into the circular polarized light. This circular polarized light then falls on a light condensing lens 8, which forms the objective lens 2 along with the solid immersion lens 1. The light condensing lens 8 converges the incident light beam to cause the converged light to fall on the solid immersion lens 1. With this solid immersion lens 1, a converged light point is formed in the vicinity of the flat portion 1b lying proximate and parallel to the surface 101a of the optical disc 101. The solid immersion lens 1 has a refractive index of 1.8, as an example.

The light beam $L_1$, condensed by the objective lens 2, having the solid immersion lens 1, is condensed as an evanescent wave on the signal recording surface 101a of the optical disc 101. The numerical aperture (NA) of the objective lens 2 in this case is on the order of 1.36.

The optical pickup device of the present invention is used for reproducing information signals recorded on an optical disc, on which the information signals have been recorded by a pit pattern of lands and grooves, or on an optical disc, on which the information signals have been recorded by exploiting the phase change. That is, the light beam $L_1$, radiated from the semiconductor laser 3 provided in the optical pickup device and condensed by the objective lens 2 so as to be illuminated on the signal recording surface of the optical disc 101, is reflected by this signal recording surface so as to be again incident on the objective lens 2. A light beam $L_2$, reflected back from the signal recording surface of the optical disc 101, is reflected in a variable fashion, depending on e.g., the presence or absence of the pit pattern formed on the signal recording surface of the optical disc 101, so as to be again incident on the objective lens 2. The reflected light $L_2$, incident on the objective lens 2, is transmitted through the objective lens 2 and the $\lambda/4$ plate 7 to fall on the polarized beam splitter 6.

The reflected light $L_2$, reflected back from the optical disc 101 towards the objective lens 2, is transmitted through the $\lambda/4$ plate 7 so as to be thereby turned from the circular polarized light into the linear polarized light. The direction of polarization in this case is perpendicular to the direction of polarization of the light beam $L_1$ radiated from the semiconductor laser 3. Consequently, the reflected light $L_2$, reflected back from the optical disc 101, is the S-polarized light with respect to the reflective surface of the polarized beam splitter 6. This light beam is reflected by the reflective surface and separated from the optical path of the return light to the semiconductor laser 3 so as to be incident on a first detector 9 adapted for detecting the information signals recorded on the optical disc 101. The first detector 9 outputs a detection signal, corresponding to the information signals recorded on the optical disc 101, from the detected reflected light $L_2$.

Figure 2A:
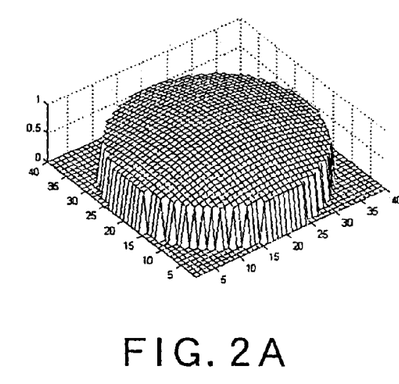
FIG. 2A is a graph showing the distribution of an X-component of the electrical field of an incident light beam on an optical disc in the optical pickup device.
Figure 2B:
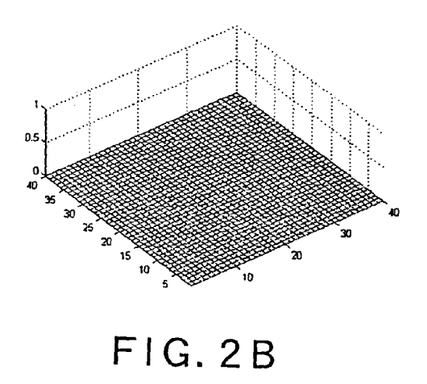
FIG. 2B is a graph showing the distribution of a Y-component thereof.

In the optical pickup device of the present invention, the light beam $L_1$, radiated from the semiconductor laser 3, is the linear polarized light having, on a plane A intermediate between the beam splitter 5 and the polarized beam splitter 6, only the component of the electrical field of the X-direction, as shown in FIG. 2A, but not having the component of the electrical field of the Y-direction, as shown in FIG. 2B.

The solid immersion lens 1, forming the objective lens 2, in the optical pickup device according to the present invention, is in intimate contact with the phase change type recording layer or the reflective film, formed on the surface of the optical disc 101, when the flat portion 1b thereof is in intimate contact with the surface 101a of the optical disc 101.

Figures 3A, 4A:
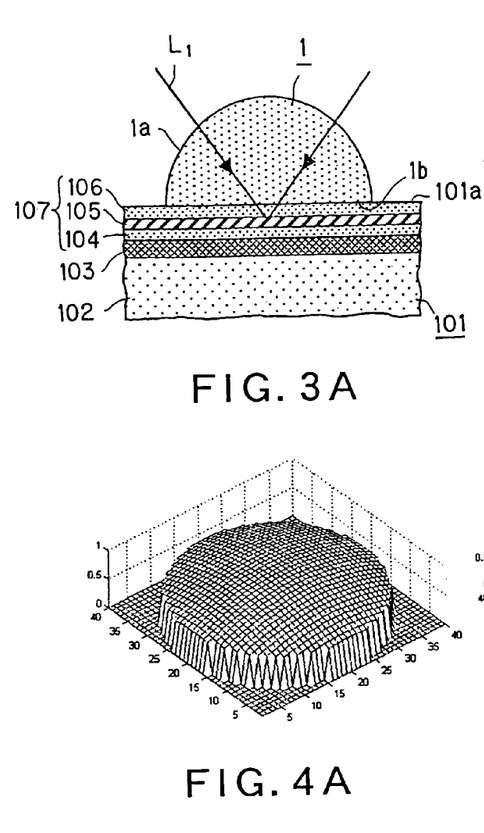
FIGS. 3A and 3B are each longitudinal cross-sectional views showing the state in which a solid immersion lens forming the objective lens of the optical pickup device is in intimate contact with the optical disc surface.
FIGS. 4A and 4B are each graphs showing the distribution of return light from the optical disc when the solid immersion lens of the optical pickup device is in intimate contact with the optical disc surface.

That is, with the optical disc 101, having a phase change type recording layer 107, a first $SiO_2$ layer 104, a GeSbTe layer 105 and a second $SiO_2$ layer 106 are sequentially deposited on an aluminum layer 103, as a reflective layer, deposited on a substrate 102, formed of synthetic resin or glass, to form the recording layer 107, as shown in FIG. 3A. When the solid immersion lens 1, forming the objective lens 2, is in intimate contact with the surface of the phase change optical disc 101, the flat portion 1b of the solid immersion lens 1 is in intimate contact with the phase change type recording layer 107, as shown in FIG. 3A.

Figures 3B, 4B:
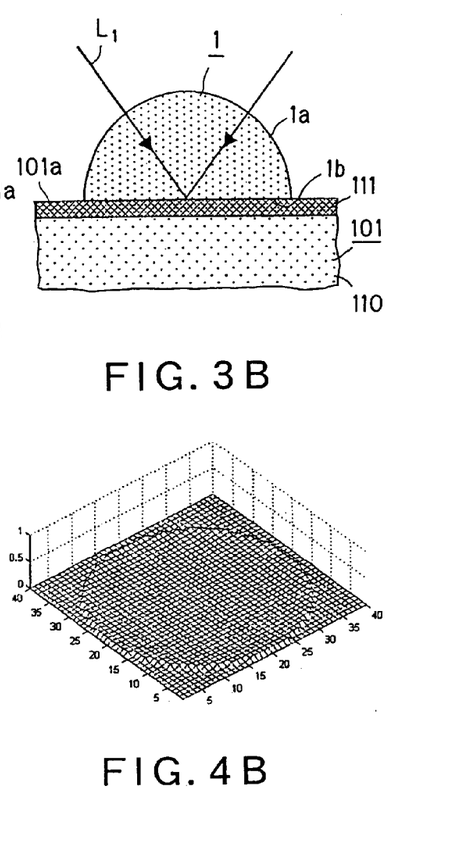

On the other hand, with the optical disc 101, having information signals recorded by a pit pattern on one surface of a substrate 110, formed of synthetic resin or glass, a reflective film 111 of aluminum is formed to overlie the pit pattern formed on one surface of the substrate 110, as shown in FIG. 3B. In the case of the optical disc, on which information signals have been recorded by this pit pattern, when the solid immersion lens 1, forming the objective lens 2, is in intimate contact with the surface of the optical disc 101, the flat portion 1b of the solid immersion lens 1 is in intimate contact with the reflective film 111, as shown in FIG. 3B.

When the flat portion 1b of the solid immersion lens 1, forming the objective lens 2, is in intimate contact with the surface 101a of the optical disc 101, as shown in FIGS. 3A and 3B, substantially the totality of reflected light from the optical disc 101 is reciprocated through the λ/4 plate 7, so that the direction of polarization of the light is rotated 90°. Thus, on a plane B, directly ahead of the first detector 9, the light incident thereon has a distribution approximately equal to the distribution of the light beam $L_1$ radiated from the semiconductor laser 3, as shown in FIG. 4A. The reflected light $L_2$ from the optical disc 101 is scarcely returned at this time to the plane A lying intermediate the beam splitter 5 and the polarized beam splitter 6, as shown in FIG. 4B.

Figure 5:
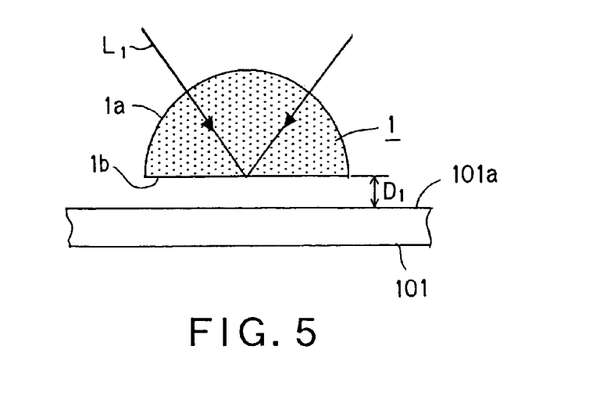
FIG. 5 is a longitudinal cross-sectional view showing the state in which the solid immersion lens of the optical pickup device is spaced apart from the optical disc surface.

When the solid immersion lens 1 is separated a preset distance $D_1$ from the surface 101a of the optical disc 101, as shown in FIG. 5, the light collected in the vicinity of the flat portion 1b of the solid immersion lens 1 and which is incident at an angle exceeding the critical angle in the flat portion 1b (refractive index of the solid immersion lens nsil×sin(incident angle)>1) is totally reflected on the flat portion 1b.

Figure 6A:
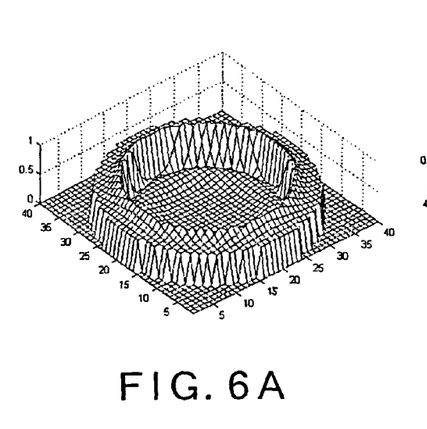
FIGS. 6A and 6B are each graphs showing the distribution of return light from the optical disc when the solid immersion lens of the optical pickup device is spaced apart from the optical disc surface.

When the light $L_3$, totally reflected on the flat portion 1b of the solid immersion lens 1, is totally reflected in this manner on the flat portion 1b, its direction of polarization undergoes delicate rotation. Thus, the light $L_3$, totally reflected by the flat portion 1b of the solid immersion lens 1, contains a polarized light component which is perpendicular to the reflected light $L_2$ that is produced when the flat portion 1b of the solid immersion lens 1 is in intimate contact with the surface 101a of the optical disc 101. Consequently, the distribution of the return light on the plane A, which is the plane intermediate the beam splitter 5 and the polarized beam splitter 6, is such a one which will be produced when only the rim portion of the light beam $L_1$ radiated from the semiconductor laser 3 is returned, as shown in FIG. 6A.

Thus, the light returned to the plane A intermediate between the beam splitter 5 and the polarized beam splitter 6, is reflected by the reflective surface of the beam splitter 5, so as to be received by a second detector 10, which is used for producing a gap error signal, as shown in FIG. 1. This gap error signal is associated with the distance $D_1$ between the flat portion 1b of the solid immersion lens 1 and the surface 101a of the optical disc 1.

Figure 6B:
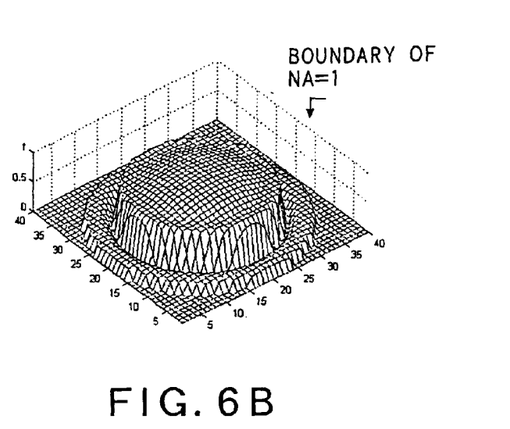

The distribution of the return light on the plane B, directly ahead of the first detector 9, is such a one in which the rim portion of the light beam $L_1$ radiated from the semiconductor laser 3 is lacking, as shown in FIG. 6B.

Figure 7:
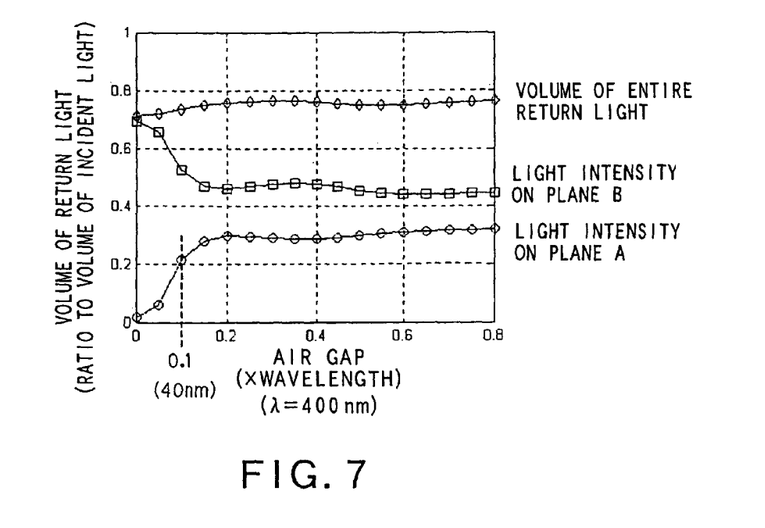
FIG. 7 is graph showing the relationship between the distance between the solid immersion lens of the optical pickup device and the optical disc surface and gap error signals.

The relationship between the volume of light received by the second detector 10 and the distance (air gap) $D_1$ between the flat portion 1b of the solid immersion lens 1 and the surface 101a of the optical disc 101 is such that, if, as shown in FIG. 7, the position of the solid immersion lens 1 in the direction towards and away from the optical disc 101 is controlled so that the light volume on the second detector 10 will be maintained at a ratio of 0.2 with respect to the incident light volume, the distance $D_1$ (air gap) may be kept at one-tenth of the wavelength λ of the light beam used.

Figure 8:
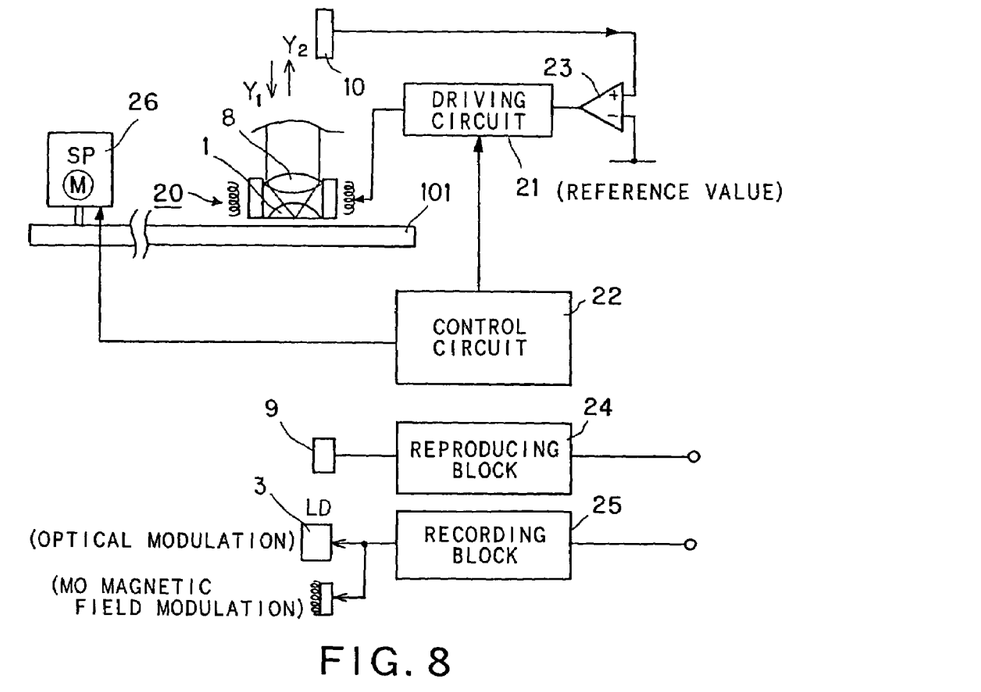
FIG. 8 is a block diagram showing an optical pickup device and a recording and/or reproducing apparatus employing the optical pickup device according to the present invention.

The optical pickup device of the present invention includes a control device for maintaining the distance $D_1$ between the surface 101a of the optical disc 101 and the flat portion 1b of the solid immersion lens 1 at a preset value. This control device includes a voice coil motor 20, forming a driving mechanism for causing movement of the solid immersion lens 1 in a direction towards and away from the optical disc 101, a driving circuit 21 for driving the motor 20 and a control circuit 22 forming a controller for controlling the driving circuit 21, as shown in FIG. 8. The driving circuit 21 drives the voice coil motor 20 to control the distance $D_1$ between the surface 101a of the optical disc 101 and the flat portion 1b of the solid immersion lens 1. The control circuit 22 causes the driving circuit 21 to control the position of the solid immersion lens 1 in a direction towards and away from the optical disc 101, indicated by arrows Y1 and Y2 in FIG. 8, to maintain the intensity of light detected by the second detector 10 at a preset intensity, thereby performing control to maintain the distance $D_1$ between the surface 101a of the optical disc 101 and the flat portion 1b of the solid immersion lens 1 at a preset value.

For maintaining the light intensity, as detected by the second detector 10, at a preset value, the output signal of the second detector 10 is compared by a comparator 23 to a preset reference value. For determining this reference value, the following methods may be used.

The first method is such a one in which an average value of an output of the second detector 10 when the surface 101*a* of the optical disc 101 is in intimate contact with the flat portion 1*b* of the solid immersion lens 1, that is when the distance $D_1$ between the surface 101*a* of the optical disc 101 and the flat portion 1*b* of the solid immersion lens 1 is zero, and an output of the second detector 10 when the distance $D_1$ between the surface 101*a* and the flat portion 1*b* is sufficiently large, is used as the reference value.

The second method is such a one in which the distance $D_1$ between the surface 101*a* of the optical disc 101 and the flat portion 1*b* of the solid immersion lens 1 is measured by another suitable method and the correlation between the measured value and the output of the second detector 10 is found to determine an output corresponding to the preset distance $D_1$ for use as the reference value.

The third method is such a one in which one-half of the output of the second detector 10 in case the distance $D_1$ between the surface 101*a* of the optical disc 101 and the flat portion 1*b* of the solid immersion lens 1 is sufficiently large is used as the reference value.

Referring to FIG. 8, a recording and/or reproducing apparatus according to the present invention, employing the above-described optical pickup device, includes a reproducing circuit (reproducing block) 24 for maintaining a preset position relationships between the optical disc 101 and the optical pickup device, by providing a supporting mechanism for supporting the optical disc 101, and for processing signals output from the optical pickup device, a recording circuit (recording block) 25 for processing signals recorded on the optical disc 101 by this optical pickup device, and a control circuit 22 for controlling the optical pickup device. When the optical disc 101 is used as the optical recording medium, the supporting mechanism is a spindle mechanism 26 including a spindle motor holding the center portion of and rotationally driving the optical disc.

Figure 9:
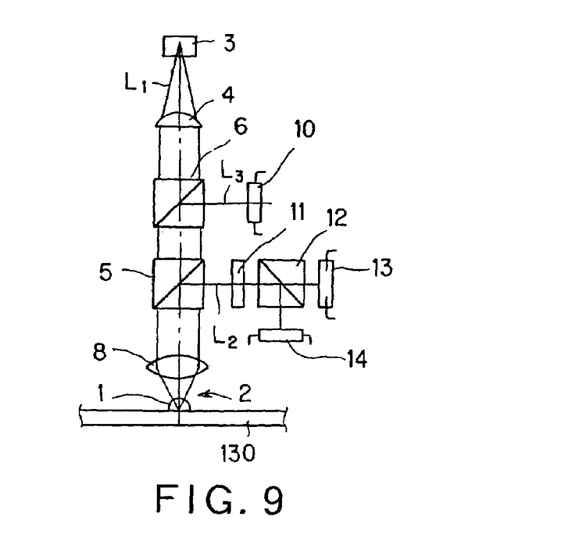
FIG. 9 is a side view showing a modification of the optical pickup device according to the present invention.

When the optical pickup device according to the present invention is used in conjunction with a magneto-optical disc 130, as an optical recording medium, the light beam $L_1$, radiated from the semiconductor laser 3, is condensed on the signal recording surface of the magneto-optical disc 130, after passing through the collimator lens 4, polarized beam splitter 6, beam splitter 5, light condensing lens 8 and the solid immersion lens 1, as shown in FIG. 9. In the present optical pickup device, no λ/4 plate is provided on the forward optical path on which the light beam $L_1$ radiated from the semiconductor laser 3 travels to fall on the magneto-optical disc 130.

The reflected light $L_2$, reflected back from the magneto-optical disc 130, is separated by the beam splitter 5 and is then transmitted through a λ/2 plate 11, operating as a rotatory polarizer, whereby the direction of polarization is rotated 45°. The resulting light then is incident on a second polarized beam splitter 12. The λ/2 plate 11 is arranged with its optical axis tilted at an angle of 22.5° relative to the direction of polarization of the incident linear polarized light.

When reflected by the signal recording surface of the magneto-optical disc 130, the reflected light $L_2$, incident on the second polarized beam splitter 12, is separated in dependence upon the Kerr rotating angle resulting from the photomagnetic effect so as to be received by a first detector 13 and a second detector 14 for generating photomagnetic signals. A difference signal between the output signals of the first and second detectors 13, 14, which becomes zero when the reflected light $L_2$ is not subjected to Kerr rotation, is detected as an output corresponding to the Kerr rotation angle, generated in the reflected light $L_2$, so as to be used as a photomagnetic signal.

The return light $L_3$ for producing a gap error signal, reflected back from the flat portion 1*b* of the solid immersion lens 1, is transmitted through the beam splitter 5 and returned to the polarized beam splitter 6. The return light is then reflected by the polarized beam splitter 6 and received by the third detector 10 used for producing the gap error signal.

Figure 10:
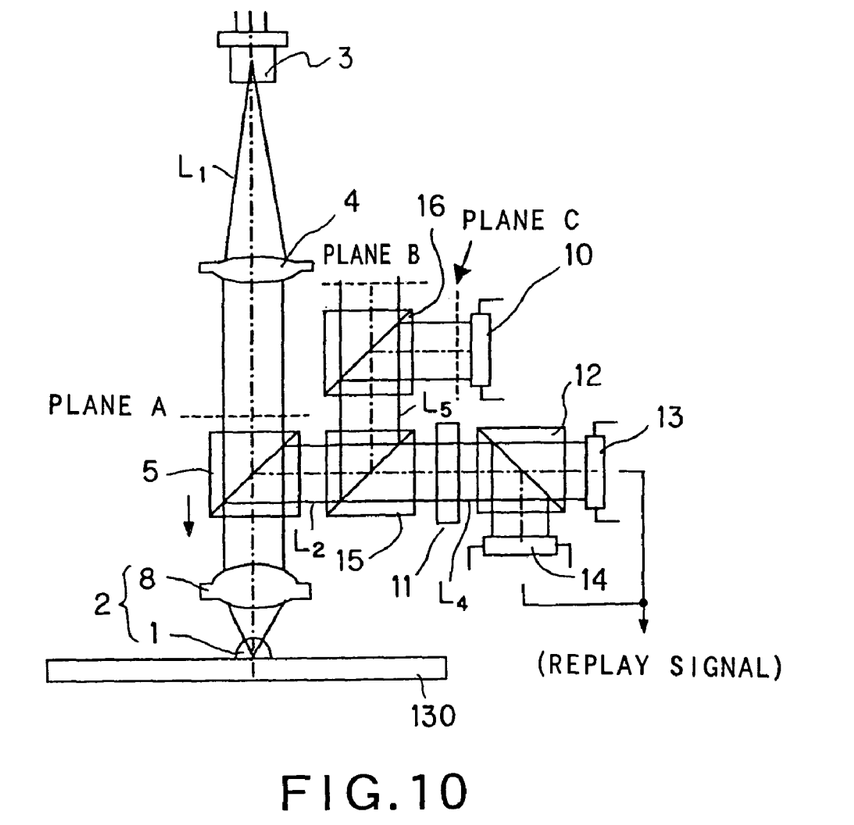
FIG. 10 is a side view showing a further modification of the optical pickup device according to the present invention.

If the magneto-optical disc 130 is used as an optical recording medium, the optical pickup device according to the present invention may be designed so that the light beam $L_1$ radiated from the semiconductor laser 3 is condensed on the signal recording surface of the magneto-optical disc 130 after passing through the collimator lens 4, beam splitter 5, condensing lens 8 and the solid immersion lens 1, as shown in FIG. 10.

The light beam $L_1$, illuminated on the signal recording surface of the magneto-optical disc 130, is reflected by this signal recording surface and proves to be a return light beam $L_2$, which is reflected by the beam splitter 5 and separated by a second beam splitter 15 into two light beams $L_4$ and $L_5$. The light beam $L_4$, transmitted through the second beam splitter 15, is transmitted through the λ/2 plate 11 and has its direction of polarization rotated 45° to fall on the polarized beam splitter 12. The λ/2 plate 11 is mounted at an angle of tilt of 22.5° with respect to the direction of the incident linear polarized light.

When reflected on the signal recording surface of the magneto-optical disc 130, the light incident on the polarized beam splitter 12 is separated, in dependence upon the Kerr rotation angle produced under the photomagnetic effect, so as to be received by the first and second detectors 13 and 14, adapted for producing photomagnetic signals. A difference signal between the output signals of the first and second detectors 13, 14, which becomes zero when the reflected light is not subjected to Kerr rotation, is detected as an output corresponding to the Kerr rotation angle generated in the reflected light, so as to be used as a photomagnetic signal.

The light beam reflected by the second beam splitter 15 is incident on a second polarized beam splitter 16. A fraction of this light beam, used for obtaining the gap error signal, and which has been returned from the flat portion of the solid immersion lens 1, is reflected by the second polarized beam splitter 16 so as to be received by the third detector 10 designed for producing the gap error signal.

In the present optical pickup device, as in the optical system shown in FIG. 1, the state of polarization of the light incident on the beam splitter 5 is such that the incident light is the linear polarized light having only the electrical field component in the X-direction, as shown in FIG. 2A, but not having the electrical field component in the Y-direction, as shown in FIG. 2B. The respective beam splitters 5, 15 transmit and reflect equal amounts of the polarized light components in the X- and Y-directions.

Figure 11:
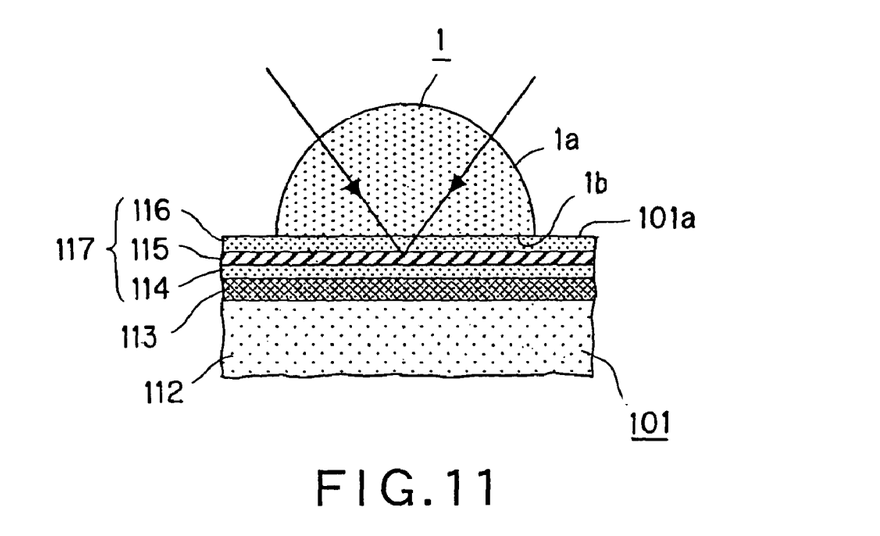
FIG. 11 is a longitudinal cross-sectional view showing the state in which the solid immersion lens of the optical pickup device shown in FIG. 10 is in intimate contact with the optical disc surface.

When the optical pickup device shown in FIG. 10 is used for the optical disc 101 having the phase change type recording layer, the flat portion 1*b* of the solid immersion lens 1 forming the objective lens 2 is intimately contacted with the surface 101*a* of the optical disc 101. The flat portion 1*b* of the solid immersion lens 1 is intimately contacted at this time with a recording layer 117, formed on one surface of a substrate 112 of the optical disc 101, as shown in FIG. 11. The recording layer 117, provided on the optical disc 101, shown in FIG. 11, is formed by sequentially layering a first SiO$_2$ layer 114, a TeFeCo layer 115 and a second SiO$_2$ layer 116, on an aluminum layer 113, provided on a substrate 112 of synthetic resin or glass, for forming a reflective film.

Figure 12A:
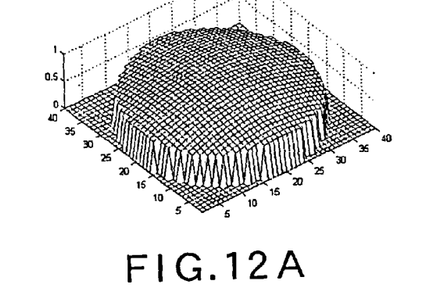
FIGS. 12A and 12B are each graphs showing the distribution of the return light from the optical disc when the solid immersion lens of the optical pickup device shown in FIG. 10 is in intimate contact with the optical disc.
Figure 12B:
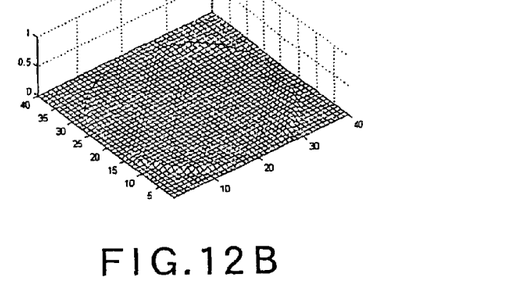

When the flat portion 1b of the solid immersion lens 1 of the optical pickup device, shown in FIG. 10, is intimately contacted with the surface 101a of the optical disc 101, the distribution of the return light on the plane B, which the light reaches after transmission through the second polarized beam splitter 16, is approximately equal to that of the outgoing light from the semiconductor laser 3, as shown in FIG. 12A. There is scarcely any light returned from the optical disc 101 to the plane C which lies directly ahead of the third detector 10 on which falls the light reflected by the second polarized beam splitter 16, as shown in FIG. 12B. Thus, when the flat portion 1b of the solid immersion lens 1 is in intimate contact with the surface 101a of the optical disc 101, the return light on the plane C is practically nil, such that the reflected light scarcely reaches the third detector 10.

When the solid immersion lens 1 is separated from the optical disc 101, the light collected in the vicinity of the flat portion 1b of the solid immersion lens 1 and which is incident at an angle exceeding the critical angle in the flat portion 1b (refractive index of the solid immersion lens nsil×sin(incident angle)>1) is totally reflected on the flat portion 1b, as shown in FIG. 5.

When the light totally reflected on the flat portion 1b of the solid immersion lens 1 is totally reflected in this manner on the flat portion 1b, its direction of polarization undergoes delicate rotation. Thus, the light, totally reflected by the flat portion 1b of the solid immersion lens 1, contains a polarized light component which is perpendicular to the reflected light that is produced when the flat portion 1b of the solid immersion lens 1 is intimately contacted with the surface 101a of the optical disc 101. Consequently, the distribution of the return light on the plane C, lying directly ahead of the third detector 10, on the path of light reflected by the second polarized beam splitter 16 to fall on the third detector 10, is such a one in which part of the rim of the light beam has been returned, as shown in FIG. 13B.

The light returned to the plane C in this manner is received by the third detector 10, adapted for producing the gap error signal. This gap error signal is a signal associated with the distance D$_1$ between the flat portion 1b of the solid immersion lens 1 and the surface 101a of the optical disc 101.

Figure 13A:
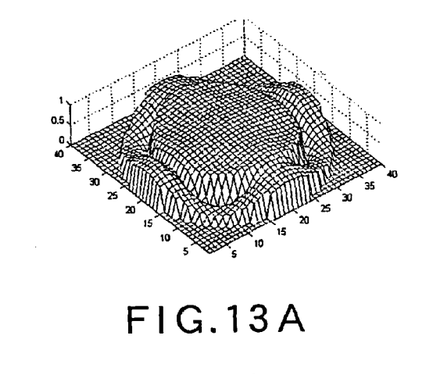
FIGS. 13A and 13B are each graphs showing the distribution of the return light from the optical disc when the solid immersion lens of the optical pickup device shown in FIG. 10 is spaced apart from the optical disc.
Figure 13B:
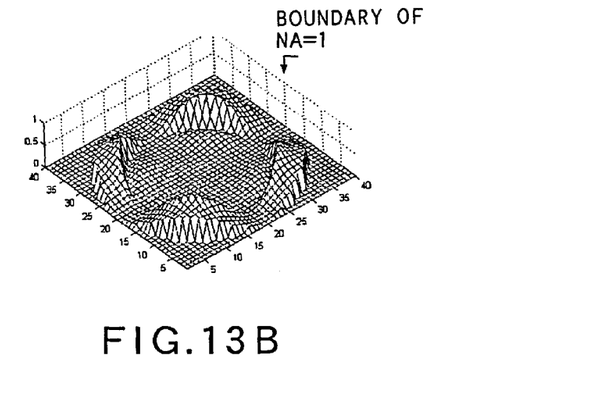

At this time, the light distribution on the plane B, which the light transmitted through the second polarized beam splitter 16 reaches, is such a one in which the portion corresponding to the rim of the light beam is lacking, as shown in FIG. 13A.

Figure 14:
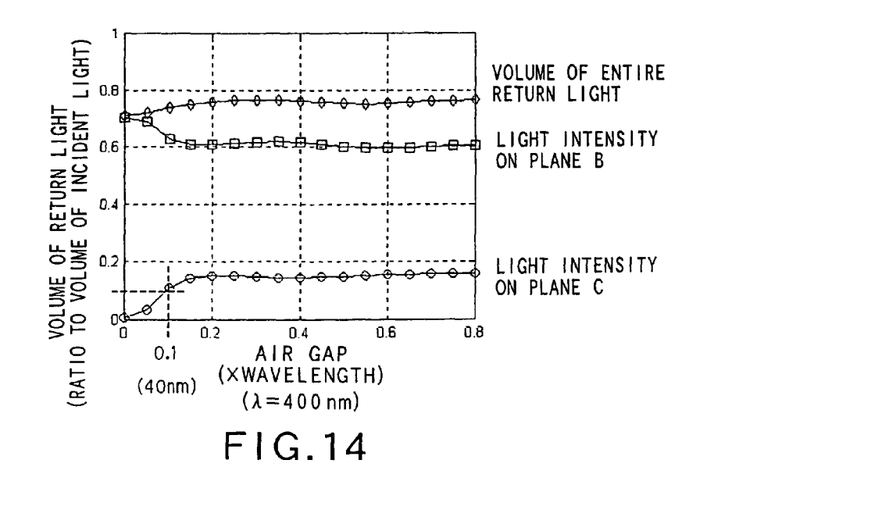
FIG. 14 is a graph showing the relationship between the distance between the solid immersion lens of the optical pickup device shown in FIG. 10 and the optical disc surface and the gap error signals.

As for the relationship between the light volume received by the third detector 10 and the distance D$_1$ (air gap) between the flat portion 1b of the solid immersion lens 1 and the surface 101a of the optical disc 101, the distance D$_1$ (air gap) can be maintained to one-tenth of the wavelength by controlling the position along the direction towards and away from the optical disc 101 of the solid immersion lens 1, as shown in FIG. 14, so that the light volume on the third detector 10 will be maintained at one-tenth of the incident light volume.

In the above-described respective optical pickup devices, the explanation on the optical system for tracking error detection is omitted. However, any suitable optical systems for tracking error detection may be provided to detect tracking error signals to effect tracking error control for the objective lens.

INDUSTRIAL APPLICABILITY

As described above, the present invention provides an optical pickup device having an objective lens, with the numerical aperture not less than 1, including a solid immersion lens having a spherical portion and a flat portion parallel to the surface of an optical recording medium, in which the component of the reflected light in the polarized state from the optical recording medium which is perpendicular to the polarized state of the reflected light which prevails when the distance between the surface of the optical recording medium and the flat portion of the solid immersion lens is zero, is detected, and the distance between the surface of the optical recording medium and the flat portion of the solid immersion lens is detected from the detected light intensity, so that the minute gap between the optical recording medium and the solid immersion lens can be detected accurately.

The invention claimed is:

1. An optical pickup device including an objective lens, with a numerical aperture (NA) being not less than 1, having a solid immersion lens which is made up by a spherical portion and a flat portion parallel to the surface of an optical recording medium, said optical pickup device comprising:
    a light source for illuminating a light beam of a preset polarized state through said objective lens to said optical recording medium; and
    photodetector means for detecting the component of the light reflected back from said optical recording medium in the polarized state perpendicular to the polarized state of the reflected light which prevails when the distance between the surface of said optical recording medium and said flat portion of said solid immersion lens is zero;
    the intensity of light detected by said photodetector means being associated with the distance between the surface of said optical recording medium and said flat portion of said solid immersion lens.

2. The optical pickup device according to claim 1 further comprising:
    driving means for causing movement of said solid immersion lens in a direction towards and away from said optical recording medium for varying the distance between the surface of the optical recording medium and said flat portion of said solid immersion lens; and
    controlling means for controlling said driving means for controlling the position of said solid immersion lens in the direction towards and away from said optical recording medium, said controlling means maintaining the intensity of light detected by said photodetector means to a preset intensity for maintaining the distance between the surface of the optical recording medium and the flat portion of the solid immersion lens to a preset value.

3. A recording and/or reproducing apparatus comprising:
    medium holding means for holding an optical recording medium;
    an optical pickup device including an objective lens, with a numerical aperture (NA) being not less than 1, having a solid immersion lens which is made up by a spherical portion and a flat portion extending parallel to the surface of an optical recording medium, held by said medium holding means, a light source for illuminating a light beam of a preset polarized state through said objective lens to said optical recording medium, and photodetector means for detecting the component of the light reflected back from said optical recording medium in the polarized state perpendicular to the polarized state of the reflected light which prevails when the distance between the surface of said optical recording medium and said flat portion of said solid immersion lens is zero, said optical pickup device writing or reading out information signals for said optical recording medium;

driving means for causing movement of said solid immersion lens in a direction towards and away from said optical recording medium for varying the distance between the surface of the optical recording medium and said flat portion of said solid immersion lens; and controlling means for controlling said driving means for controlling the position of said solid immersion lens in the direction towards and away from said optical recording medium, said controlling means maintaining the intensity of light detected by said photodetector means to a preset intensity for maintaining the distance between the surface of the optical recording medium and the flat portion of the solid immersion lens to a preset value.

4. A gap detecting method for detecting, in an optical pickup device including an objective lens, with a numerical aperture (NA) being not less than 1, having a solid immersion lens which is made up by a spherical portion and a flat portion extending parallel to the surface of an optical recording medium, the distance between said flat portion of said solid immersion lens and the surface of said optical recording medium, said method comprising:

illuminating a light beam radiated from a light source of said optical pickup device through said objective lens to said optical recording medium in a preset polarized state;

detecting, by photodetector means of said optical pickup device, the component of said light beam reflected from said optical recording medium in the polarized state which is perpendicular to the polarized state of the reflected light which prevails when the distance between the surface of the optical recording medium and the flat portion of said solid immersion lens is zero; and correlating the intensity of light detected by said photodetector means with the distance between the surface of the optical recording medium and the flat portion of said solid immersion lens for detecting the distance between the surface of the optical recording medium and the flat portion of said solid immersion lens.

5. A controlling method for controlling, in an optical pickup device including an objective lens, with a numerical aperture (NA) being not less than 1, having a solid immersion lens which is made up by a spherical portion and a flat portion parallel to the surface of an optical recording medium, the distance between said flat portion of said solid immersion lens and the surface of said optical recording medium, to a preset value, comprising:

illuminating a light beam radiated from a light source of said optical pickup device through said objective lens to said optical recording medium in a preset polarized state;

detecting, by photodetector means of said optical pickup device, the component of the light beam reflected from said optical recording medium in the polarized state which is perpendicular to the polarized state of the reflected light which prevails when the distance between the surface of the optical recording medium and the flat portion of said solid immersion lens is zero;

moving said solid immersion lens in a direction towards and away from said optical recording medium, using driving means, for varying the distance between the surface of the optical recording medium and the flat portion of said solid immersion lens; and controlling said driving means, using controlling means, for controlling the position of said solid immersion lens in the direction towards and away from said optical recording medium, said controlling means maintaining the intensity of light detected by said photodetector means to a preset intensity for maintaining the distance between the surface of the optical recording medium and the flat portion of the solid immersion lens to a preset value.

* * * * *